US010536012B2

(12) United States Patent
Miller et al.

(10) Patent No.: US 10,536,012 B2
(45) Date of Patent: Jan. 14, 2020

(54) DECORATIVE AND PORTABLE POWER CHARGER WITH MOTION LIGHT

(71) Applicant: Halo2Cloud, LLC, Hartford, CT (US)

(72) Inventors: Garold C. Miller, Hartford, CT (US); Nathan Daniel Weinstein, Hartford, CT (US)

(73) Assignee: Halo2Cloud, LLC, Hartford, CT (US)

( * ) Notice: Subject to any disclaimer, the term of this patent is extended or adjusted under 35 U.S.C. 154(b) by 112 days.

(21) Appl. No.: 15/815,257

(22) Filed: Nov. 16, 2017

(65) Prior Publication Data

US 2018/0102655 A1    Apr. 12, 2018

Related U.S. Application Data (63) Continuation-in-part of application No. 15/730,341, filed on Oct. 11, 2017.
(Continued)

(51) Int. Cl.
| | |
|---|---|
| H02J 7/00 | (2006.01) |
| H02J 7/02 | (2016.01) |
| F21V 3/00 | (2015.01) |
| F21V 23/04 | (2006.01) |
| F21L 4/08 | (2006.01) |

(Continued)

(52) U.S. Cl.
CPC ............. *H02J 7/0042* (2013.01); *F21L 4/08* (2013.01); *F21V 3/00* (2013.01); *F21V 19/0015* (2013.01); *F21V 23/0471* (2013.01); *H02J 7/0054* (2013.01); *H02J 7/0068* (2013.01); *H02J 7/025* (2013.01); *H05B 37/0281* (2013.01); *F21Y 2115/10* (2016.08); *G08B 5/36* (2013.01); *G08B 21/182* (2013.01); *H05B 33/0845* (2013.01)

(58) Field of Classification Search
CPC ...... H02J 7/0042; H02J 7/0054; H02J 7/0068; H02J 7/025; H02J 2007/0062; H02J 50/20; H02J 50/10; H05B 37/0227; H05B 33/0845; H05B 37/0281; F21V 33/00; F21V 19/0015; F21V 23/0471; F21V 3/00; F21L 4/08; G08B 5/36; G08B 21/182; F21Y 2115/10
USPC .......................................................... 320/128
See application file for complete search history.

(56) References Cited

U.S. PATENT DOCUMENTS

6,762,583 B2 * 7/2004 Ho ..................... H02J 7/0042
320/107
D578,960 S    10/2008 Fisher et al.
(Continued)

*Primary Examiner* — M Baye Diao
(74) *Attorney, Agent, or Firm* — Lathrop Gage LLP (57) ABSTRACT

A compact, decorative portable charger is provided for charging an electronic device on-the-go. The portable charger has a charger housing having a rechargeable battery internally disposed therein for connecting to and recharging an electronic device, as necessary, via a power connection female port, a power connection male interface, and/or a wireless transmitter disposed within the charger housing. The internal rechargeable battery of the portable charger can be recharged via a power connection female port, a power connection male interface, and/or a wireless receiver disposed within the charger housing. The portable charger further includes a motion light triggered by a motion sensor, and an attachment mechanism whereby the portable charger can be used as a fashion accessory attached, for example, to a purse, bag, or article of clothing, readily accessible for use to recharge electronic devices.

19 Claims, 7 Drawing Sheets

Related U.S. Application Data (60) Provisional application No. 62/406,494, filed on Oct. 11, 2016.

(51) Int. Cl.
  F21V 19/00 (2006.01)
  H05B 37/02 (2006.01)
  G08B 21/18 (2006.01)
  H05B 33/08 (2006.01)
  F21Y 115/10 (2016.01)
  G08B 5/36 (2006.01)

(56) References Cited

U.S. PATENT DOCUMENTS

| | | | |
|---|---|---|---|
| D659,093 S | 5/2012 | Schmid et al. | |
| D659,094 S | 5/2012 | Brand et al. | |
| D663,684 S | 7/2012 | Yang | |
| D663,685 S | 7/2012 | Yang | |
| D702,632 S | 4/2014 | Salmon | |
| D720,289 S | 12/2014 | Chiang et al. | |
| D725,034 S | 3/2015 | Chen | |
| 9,093,848 B2* | 7/2015 | Miller | H02J 7/0027 |
| D770,430 S | 11/2016 | Lee | |
| D772,813 S | 11/2016 | Wahl | |
| D775,233 S | 12/2016 | Beck et al. | |
| D784,259 S | 4/2017 | Huang et al. | |
| D803,410 S | 11/2017 | Im et al. | |
| D805,926 S | 12/2017 | Im et al. | |
| D816,052 S | 4/2018 | Pallakoff et al. | |
| D816,053 S | 4/2018 | Pallakoff et al. | |
| 2008/0035507 A1* | 2/2008 | Collister | B25H 3/006 |
| | | | 206/349 |
| 2009/0283561 A1* | 11/2009 | Zamora | A45F 3/12 |
| | | | 224/264 |
| 2013/0026981 A1 | 1/2013 | Van Der Lee | |
| 2013/0043827 A1* | 2/2013 | Weinstein | H02J 7/0027 |
| | | | 320/103 |
| 2013/0193911 A1* | 8/2013 | Miller | H02J 7/0042 |
| | | | 320/107 |
| 2014/0111159 A1* | 4/2014 | Siminoff | H02J 7/0042 |
| | | | 320/111 |
| 2014/0151079 A1* | 6/2014 | Furui | B25F 5/02 |
| | | | 173/46 |
| 2014/0152257 A1* | 6/2014 | Miller | H02J 7/0042 |
| | | | 320/111 |
| 2014/0159640 A1* | 6/2014 | Yoshikawa | H02J 7/0044 |
| | | | 320/103 |
| 2015/0155736 A1 | 6/2015 | Sun et al. | |
| 2015/0270728 A1* | 9/2015 | Williams | H02J 7/0044 |
| | | | 320/111 |
| 2015/0288204 A1* | 10/2015 | Weinstein | H02J 7/0044 |
| | | | 320/107 |
| 2016/0056647 A1* | 2/2016 | Choi | H02J 7/0045 |
| | | | 320/107 |
| 2016/0380446 A1 | 12/2016 | Loewen | |
| 2017/0110902 A1* | 4/2017 | Miller | H02J 7/025 |
| 2017/0264118 A1 | 9/2017 | Miller et al. | |
| 2017/0321853 A1* | 11/2017 | Chien | H02J 7/0027 |
| 2018/0366971 A1* | 12/2018 | Miller | H02J 7/0055 |

* cited by examiner

DECORATIVE AND PORTABLE POWER CHARGER WITH MOTION LIGHT

CROSS-REFERENCE TO RELATED APPLICATION

This application is a continuation-in-part and claims the benefit of U.S. application Ser. No. 15/730,341, filed Oct. 11, 2017, which claims the benefit of U.S. Provisional Patent Application No. 62/406,494, filed Oct. 11, 2016, each of which is incorporated herein by reference in its entirety.

FIELD OF INVENTION

The present invention generally relates to power chargers for electronic devices, and more particularly relates to a decorative portable power charger that can be attached as a personalized accessory to a bag or purse, having a motion light feature and other features that improve upon its use and functionality.

BACKGROUND OF THE INVENTION

Present day consumers typically own several electronic devices specifically designed for portability and use on-the-go, including, for example, a mobile phone or smart phone, a portable music player like an iPod® or an MP3 player, a tablet, a portable gaming unit, and the like. Each of these devices requires frequent recharging. Such electronic devices typically require connection to an external power source, such as a wall outlet, a car charger, an airplane charger, or a computer, for recharging. However, many times, such a power source is not readily available or close by, and the electronic device has insufficient charge remaining before the user can get to a power source to connect the device. Moreover, even when the device is connected to an external power source for recharging, it is difficult to continue using the device, as the device need to remain tethered to the power source.

Similarly, a separate charging cable is usually required for connecting an electronic device with a particular power source. For example, a consumer will have one cable for charging a phone at home with an AC wall socket, and another cable for charging the phone in the car using the DC car charging socket, and perhaps additional cables for charging the phone using a computer or on an airplane. Moreover, different electronic devices often utilize different connection ports and interfaces such that a single charging cable is not compatible with multiple devices. Accordingly, a tech-savvy consumer, with several electronic devices, will usually have multiple charging cables to keep track of. Even then, the consumer may not always be in a place where a power source is readily available, for example, if they are at the park, or may not have the appropriate cable or adapter available to use with a particular power source, for example, they are in the office but left their charging cable at home, or may be without sufficient power to recharge a phone or other device due to bad weather or a power outage.

On occasion, an electronic device needs a small amount of charge to finish a task before the device powers down due to insufficient battery capacity. For example, a user on a call using a mobile phone may wish to finish the call, but cannot find a power source to plug into, may not have enough time to get to a power source, or may not have the appropriate charging cable with her at the time. As noted, if the phone is plugged into a traditional power source, like a wall socket, it is difficult to continue using the phone as desired. Accordingly, what is needed is a power charger, even with a small boost of power, that is as portable as the electronic device and preferably easy to carry with the electronic device, and thus easily usable on-the-go.

Further, portable power chargers designed for use on-the-go must be suitable to a variety of conditions, as they are often most in need where a standard external power source is not available, and thus often needed when there is no power at all. For example, a portable power charger is especially useful when walking, camping, at the park, at the mall, or at a sporting event, where one may need to use a phone in an emergency situation. On occasion, it may be dark when the charger is needed, and thus there is insufficient ambient light to assist in use of the charger or the electronic device needed a power boost. Accordingly, there is a need for a portable charger with the versatility of providing a light to assist in use of the power charger to connect to an electronic device needing a charge, or simply as a flashlight to help the user in a time of need even when the power charger is not yet needed.

Still further, even portable power chargers are easy to lose track of and should be easy to locate especially when power is running out on a phone or other electronic device. Accordingly, there is a need for a portable charger that is easy to use and find—for example, one that can be attached to a bag or a purse, or even to one's clothing, so that it is ready for use and easily accessible without rummaging through one's bag or pocket. In this regard, the charger does not take up additional space in one's bag or pocket and is readily accessible whenever needed, especially for that small boost of power to continue an activity on an electronic device in a time of need. Additionally, such a portable charger can be a fashion accessory so as not to detract from one's bag, purse or wardrobe while still providing functional assistance to recharge various portable electronic devices.

There is likewise a need for a charger that can light up, either using a manual control, or one that includes a motion light, so that the user can easily connect an electronic device in need of a charge to the portable charger. Such a lighting feature can also be used as a flashlight even when the power charger is not needed.

Still further, there is a need for a portable power charger that is further accessorized to assist a user in many other ways, such as, providing a mirror.

Additionally, such portable charger devices typically require a dedicated input port for recharging the internal battery and a separate output port dedicated for recharging electrical devices from the internal battery. More particularly, such charging devices often require multiple output ports for recharging multiple electronic devices at the same time. The addition of extra charging ports compromises the size and design of the charger unit, for example, a unit with a dedicated input port and two or more output ports would need to be larger than a charger unit with just a single port due to the need to properly arrange the electronics for operation of the charger as desired. Accordingly, there is a need for a portable charger having a compact size and design that does not compromise the ability to charge electronic devices needing varying connection interfaces, or without compromising the ability to recharge the power charger. Various connection means can be provided in various embodiments, including but not limited to output connection interfaces, built-in output cables, AC and/or DC input connection interfaces, built-in input cables, and wireless transmitter and/or receiver components.

In view of the foregoing, there is a need for a decorative charger that can be used to charge a variety of electronic devices, including but not limited to smart phones, mobile phones, data tablets, music players, cameras, camcorders, gaming units, e-books, Bluetooth® headsets and earpieces, GPS devices, and the like, either individually or collectively in various combinations. Additionally, there is a need for such a charger that is portable, has a compact size, and is easy to use in various conditions and locations to charge one or more electronic devices simultaneously, including but not limited to in a house or office, a car or an airplane. Still further, there is a need for a portable charger having a port or power connector that can act both as an input for recharging an internal battery unit in the charger and as an output for recharging an electronic device connected to the charger. Still further, there is a need for a portable charger that can recharge the internal battery from an external power source at the same time as an electronic device connected to the charger, even while both the external power source and the electronic device are connected to the charger through the same port. Still further, there is a need for a portable charger unit in a compact size that has increased functionality for a user requiring a portable source of power, including by providing a lighting feature as well as other accessorized features. Accordingly, it is a general object of the present invention to provide a portable charger that improves upon conventional power chargers currently on the market and that overcomes the problems and drawbacks associated with such prior art chargers.

SUMMARY OF THE INVENTION

In accordance with the present invention, a compact, decorative portable charger is provided for charging an electronic device on-the-go. In general, a portable charger unit may comprise a portable charger housing having an internal rechargeable battery unit for connecting to and recharging one or more electronic device, as necessary, and a power connection female port and/or a power connection male interface for connecting the charger unit with at least one electronic device, or an external power source, or both.

In a first aspect of the present invention, the charger unit comprises a charger housing and a rechargeable battery unit disposed therein and operatively connected to at least one power connection port that can operate as either a power input (for providing an electrical charge from an external power source for recharging the internal battery unit when the charger unit is connected to the external power source) or a power output (for charging the internal batteries of other electronic devices from the rechargeable battery unit) or both. The charger housing further comprises at least one light powered from the internal battery unit, and a controller for controlling operation of the internal battery and light(s).

In a second aspect of the present invention, the charger unit comprises a charger housing having a dedicated power input connection port (e.g., a micro USB port) for recharging the internal battery unit when the charger is connected to an external power source, and a dedicated power output connection port (e.g., a USB port) for recharging the internal batteries of electronic devices connected to the charger unit.

In another aspect of the present invention, the charger unit uses a power connection port that can operate as a two-way charging interface. A rechargeable battery unit is disposed within the charger housing and is operatively connected with the power connection port, which may act as a power input (for providing an electrical charge from an external power source for recharging the internal battery unit when the charger unit is connected to the external power source), and which may act as a power output (for charging the internal batteries of other electronic devices from the rechargeable battery unit). The charger further includes a controller or processing unit that determines which operational mode the power connection port is in based on what is connected to the port.

In yet another aspect of the present invention, a built-in power connector cable is disposed within the charger housing, and can be extended from the charger housing for use to connect to an external power source, an electronic device, or both, as desired, and then retracted back within the charger housing when not needed. For example, the power connector cable can be disposed within a cavity formed in the charger housing when not in use, but extended from the cavity when needed to connect to an electronic device in need of a charge, or to an external power source, possibly in combination with a connection adapter so that the cable can be used with devices or power sources regardless of the connection interface needed. In embodiments of the present invention, the charger can include both a power connection port and a power connector cable.

In another embodiment of the portable power charger, a wireless transmitter can be included so that the charger can wirelessly recharge an electronic device having a requisite wireless receiver. Similarly, the charger can include a wireless receiver so that the internal battery can be recharged wirelessly from an appropriate wireless transmission charging station. In this regard, features from Applicant's U.S. Pat. No. 9,318,915 and co-pending U.S. patent application Ser. No. 15/131,352, which are incorporated herein by reference, can be utilized in the power charger of the present invention. Still further, the portable power charger can use Near Field Communication ("NFC") technology for the exchange of power and data with electronic devices capable of interacting with the power charger.

The charger housing can further include a retractable AC plug, such as illustrated and described in Applicant's U.S. Pat. No. 9,385,549, incorporated herein by reference, for recharging the internal battery unit from a standard wall socket. Still further, the charger housing can include a DC input port or a flip-out DC connection means for recharging the internal battery unit from a DC power source, such as a car charger socket.

In a preferred design of the portable power charger, the charger housing includes an attachment means for attaching the charger to a bag, a purse, or the like, or alternatively to an article of clothing, for example via a zipper or a belt loop. In this regard, the charger is easily transportable and easily accessible to ensure that it is available when a power charge is needed for one or more electronic devices. The power connection port(s)/interface(s) can be hidden within the shape and body of the charger housing.

The charger unit is portable as a result of the small size of the housing. Despite the small size of the unit, the power capacity is very high so that the charger can accommodate multiple electronic devices at the same time via a common power connection port. Similarly, the charger can utilize a common two-way power connection port to connect the internal battery unit to an external power source for recharging while simultaneously connecting the charger to one or more electronic devices for recharging via the power connection port.

One or more lights, preferably light emitting diode (LED) lights can be positioned around the perimeter of the charger housing for use as a flashlight to illuminate objects or spaces, or assist in use of the charger to connect an electronic device needing a charge. The charger may also include a motion light—which can either be the LED lights discussed above, or a dedicated motion light, that can be triggered by a motion sensor. The charger housing may also include an LED power indicator means to provide the user with information about the amount of charge in the internal battery unit of the charger.

In an embodiment of the present invention, a portable power charger comprises a housing having first and second opposing faces each including a translucent portion, and a rechargeable battery internally disposed within the housing. An attaching element is attached to the housing for attaching the charger to an object, such as a purse, a briefcase, or an article of clothing. A power connector operatively connected to the internal rechargeable battery is provided on the charger that can operate as either a power input (for providing an electrical charge from an external power source for recharging the internal battery when the charger is connected to the external power source) or a power output (for charging the internal batteries of other electronic devices from the internal battery), or both. The charger further includes a lighting element disposed within the housing and operatively connected to the internal rechargeable battery. When the lighting element is turned on, it is projected through the translucent portions of the first and second faces. Preferably, the charger includes a motion detector disposed within the housing and configured to activate the lighting element when motion is detected. More preferably, the lighting element, when turned on, gradually increases in intensity to a full power level, and also turns off after a predetermined period of time after being activated.

In preferred embodiments of the present invention, the charger unit automatically turns on when it is connected with an electronic device needing charging. More particularly, the charger unit detects the presence of a connector cable in connection with a power connection port, as well as the presence of an electronic device on the other end of the connector cable to draw power from the charger unit via the connector cable. Such technology utilizes an internal switch disposed within the charger housing and operatively connected to the rechargeable battery unit that actuates to an "on" position when the appropriate conditions are met. In alternate embodiments, a manual power control switch may also be provided so that the user can still turn the charger unit on and off as desired.

In various embodiments of the present invention, the charger unit may further comprise a controller and internal logic, which can sense the connection of one or more electronic devices with the charger via the power connection port/interface, determine if the charger is connected to an external power source via the power connection port/interface, and coordinate operation of the power connection port/interface as either a power input or a power output, or both. In preferred embodiments, the power connection port/interface can be used as a conduit for charging the internal battery unit from an external power source and as a conduit for charging electronic devices from the charger, often at the same time.

Other features of a portable power charger in accordance with the present invention include a mirror, preferable a lighted mirror, that is hidden in a hinged, flip-up cover on the charger housing.

The charger housing can have any shape, including but not limited to a rounded square, a circle, a toroid shape, a prism, or the like. The attachment means can comprise a carabiner clip, a split key ring, a stainless steel metal purse clip, or the like, attached on the end of a strap for attaching the charger to a bag, a purse, or an article of clothing.

These and other objects, features and advantages of the present invention will become apparent in light of the detailed description of embodiments thereof, as illustrated in the accompanying drawings.

DETAILED DESCRIPTION OF THE DRAWINGS

Embodiments of a decorative portable charger in accordance with various embodiments of the present invention are shown in FIGS. 1-13. As illustrated, the charger embodiments are designed to be attached to a bag or purse, or the like, or to an article of clothing, using an attachment means, such as a carabiner clip, a split key ring, or a purse clip, connected to a charger housing via a strap or a loop connected to the housing, or an opening in the housing. The charger itself generally comprises a charger housing having an internal rechargeable internal battery for recharging one or more electronic devices via at least one power connection female port, or a built-in power connection male interface provided in the charger housing, or wireless transmitter components. The internal battery can also be recharged from an external power source via a built-in male connection interface, an AC wall plug, a DC connection interface, a power connection female port, or wireless receiver components.

Other general features illustrated in the various embodiments include a power indicator means for providing capacity information for the internal battery unit, LED lights to provide a flashlight feature, and a motion detector/sensor and a motion light. Other features include but are not limited to, a mirror, preferably a lighted mirror, that is contained within a hinged, flip-up cover plate, a retractable, built-in AC wall plug, and a flip out DC connection interface, such as a car charger interface. These and other features are described in more detail below with reference to the particular embodiments provided herein.

Figure 1:
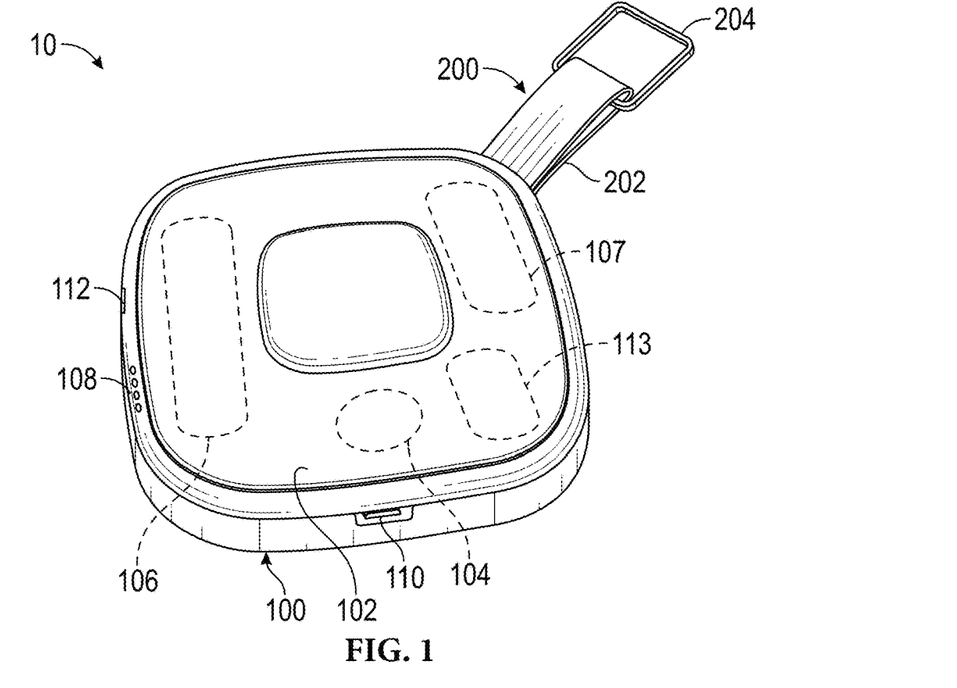
FIG. 1 shows a top, perspective view of a first embodiment of a decorative and portable power charger in accordance with the present invention.
Figure 2:
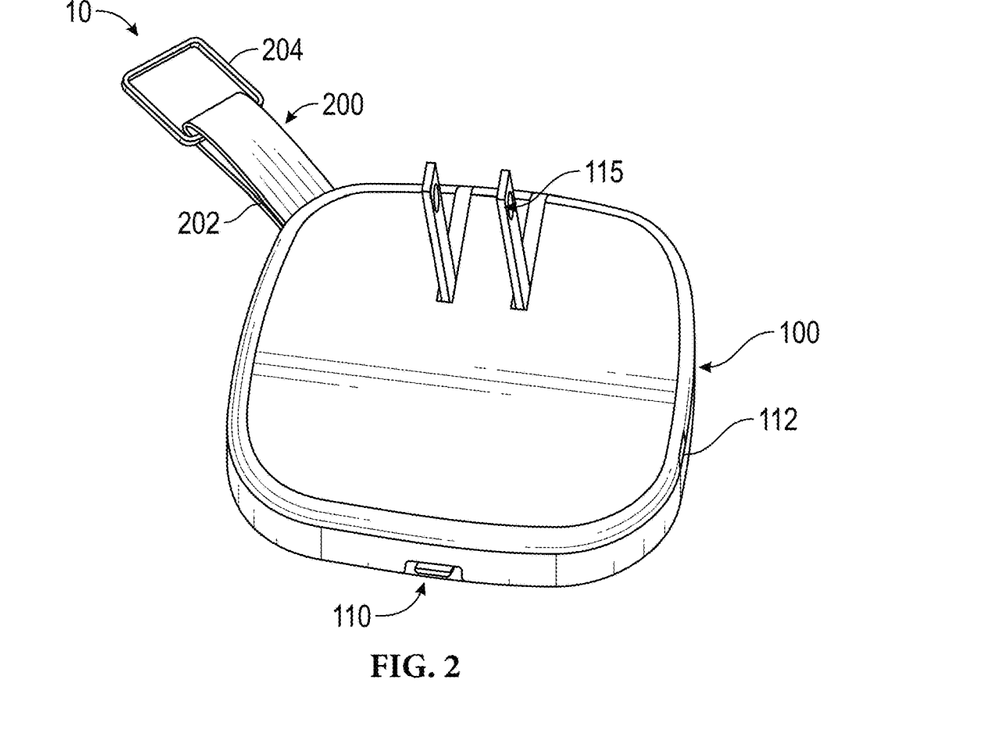
FIG. 2 shows a bottom, perspective view of the power charger shown in FIG. 1.
Figure 3:
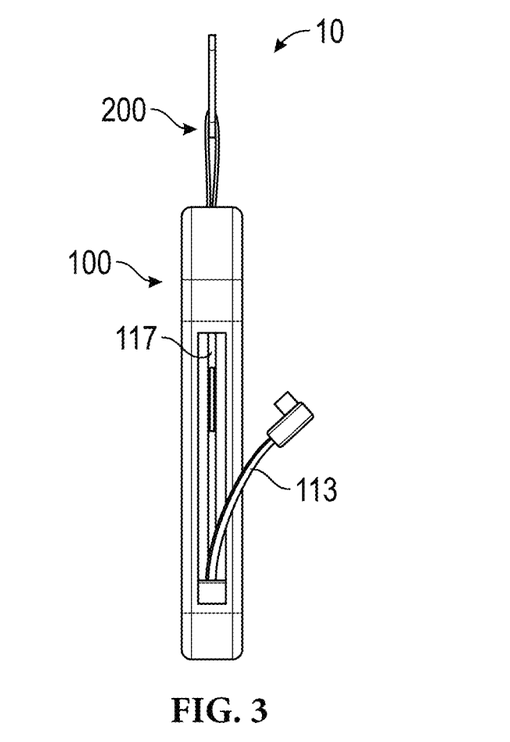
FIG. 3 shows a side view of the power charger shown in FIG. 1.

With reference to FIGS. 1-3, a first embodiment of a decorative portable power charger 10 is shown. The charger 10 includes a housing 100 connected to an attaching element 200. The housing 100 includes at least one light element 102, a motion detector 104, an internal rechargeable battery 106 disposed within the housing 100, a wireless receiver 107 disposed within the housing 100 and operatively connected to the rechargeable battery 106, a power indicator 108, a wireless transmitter 113 and a retractable AC plug 115 operatively connected with the rechargeable battery 106. The housing 100 defines a first power port 110 and a second power port 112. The rechargeable battery 106 is operatively connected to both the first power port 110 and the second power port 112.

The at least one light element 102 is configured to generate light when powered by the rechargeable battery 106. The at least one light element 102 may be configured to generate light when manually activated by a user of the charger 10. Alternatively, the at least one light element 102 may be configured to generate light when motion is detected by the motion detector 104.

The rechargeable battery 106 is configured to be charged when the first power port 110 or the second power port 112 is connected to an external power source (not shown). The rechargeable battery 106 may charge the internal battery of another electronic device (not shown) when an electronic device is connected to the charger 10 via the first power port 110 or the second power port 112. The rechargeable battery 106 may charge the internal battery of the electronic device via the first or second power ports 110, 112 even when the rechargeable battery 106 is being charged by an external power source connected to the other of the first power port 110 or second power port 112. The rechargeable battery 106 may charge the internal battery of more than one other electronic device simultaneously when a first electronic device is connected to the first power port 110 and a second electronic device is connected to the second power port 112. In this regard, each of the first and second power ports 110, 112 may be either a dedicated input connection port, a dedicated output connection port, or a two-way connection port capable of operating as both an input and an output port. In accordance with the spirit and principles of the present invention, additional power connection ports may be provided on the charger housing 100.

As noted, the charger 10 may also include wireless transmission components for charging electronic devices or for being recharged itself via wireless means. For example, the wireless receiver 107 is configured to charge the rechargeable battery 106 when the wireless receiver 107 is in proximity to an appropriate wireless transmission station (not shown). Similarly, the wireless transmitter 113 is configured to charge the battery of another electronic device having an appropriate wireless receiver when the wireless transmitter 113 is in proximity with the wireless receiver of the electronic device. In addition, or alternatively, the wireless receiver 107 may be NFC components for wireless communicating data or power with other NFC components of another device nearby.

The power indicator 108 is configured to indicate a battery charge status of the rechargeable battery 106. For example, the power indicator 108 may be a series of LED lights that represent the level of charge of the rechargeable battery 106 or, alternatively, the power indicator 108 may be a single LED light that generates a colored light that represents the level of charge of the rechargeable battery 106, e.g. green light for full or near full charge and a red light for low or near no charge.

Referring to FIG. 2, the retractable AC plug 115 is configured to mate with a standard wall socket. When the retractable AC plug 115 is mated with an energized wall socket, the rechargeable battery 106 is thereby charged. As illustrated, the plug prongs are designed to be stored within a cavity formed in the charger housing 100 when the plug 115 is not in use. In this regard, the plug 115 is not sticking out and will not interfere with the aesthetic appearance of the charger 10—for example, if it is being used as a functional fashion accessory. It should be readily understood that the retractable AC plug 115 could be instead configured as a retractable or flip-out DC connector, such as a car charger, for charging the rechargeable battery 106 with a DC power source, such as a car charger socket.

The attaching element 200 includes a strap 202 connected to the housing 100 and a fastener 204 connected to an end of the strap 202. The strap 202 may be made of one or more of any number of materials, e.g. leather, plastic or metal. The fastener 204 is configured to fasten to another object including, but not limited to, a user's clothing or bag. In FIG. 1, the fastener 204 is shown as a clip. However, the fastener 204 may be other fastener types as is known in the art. For example, the fastener 204 may be a button, magnet, carabiner or the like.

In alternative embodiments according to the present disclosure, either the first power port 110 or the second power port 112 may be a dedicated "in" or "out" port. Thus, if the first power port 110 were a dedicated "in" port, the rechargeable battery 106 could be charged by being connected to an external power source via the first power port 110, but the rechargeable battery 106 would not be able to charge the internal battery of an electronic device by connecting to the electronic device via the dedicated "in" first power port 110. Similarly, if the second power port 112 were a dedicated "out" port, the rechargeable battery 106 could charge the internal battery of an electronic device connected to the rechargeable battery 106 via the second power port 112, but the rechargeable battery 106 would not be able to be charged by an external power source being connected to the dedicated "out" second power port 112.

In embodiments, the motion detector 104 may be hidden from view of the user for aesthetic purposes. For instance, the motion detector 104 may be positioned beneath a surface of the at least one light element 102. In this configuration, the motion detector 104 may detect motion near the charger 10 without being visible to a user of the charger 10.

While the housing 100 is shown as being substantially rectangular in shape, it should be readily understood that the housing 100 may be configured to be any shape. For example, the housing 100 may be oval, circular or triangular.

With reference to FIG. 3, the housing may comprise a male connector power cable 113 configured to be stored in a cavity 117 of the housing 100, and flexed between an extended condition for use and a retracted condition for storage when not in use. In this regard, when the power cable 113 is pulled and flexed out from its storage cavity 117 to the extended condition, it can be connected to an electronic device in need of a recharge from the rechargeable battery 106 of the charger 10, or alternatively connected to an external power source for recharging the internal battery 106 of the charger 10. The male connector power cable 113 is operatively connected to the rechargeable battery 106. The charger 10 is configured to charge the internal battery of another electronic device when the electronic device is connected to the power cable 113. Advantageously, when the power cable 113 is not in use, the power cable 113 may be stored in the cavity 117 of the housing to avoid interference with the user or to preserve the aesthetics of the charger 10 when used as a functional accessory. Preferably, the cavity 117 is sized to complement the size and shape of the cable 113 so that when the cable 113 is stored, it is contained within the three-dimensional footprint of the charger housing 100 and does not detract from the aesthetic appearance of the charger 10, while still being easily flexed out of said cavity 117 for use as needed.

With reference to FIGS. 4-11, a second embodiment of a decorative and portable power charger 10' is shown. The charger 10' is similar to charger 10 shown in FIGS. 1-3 and described above. Similar components are numbered the same or similarly as those shown in the embodiment of FIGS. 1-3.

Figure 4:
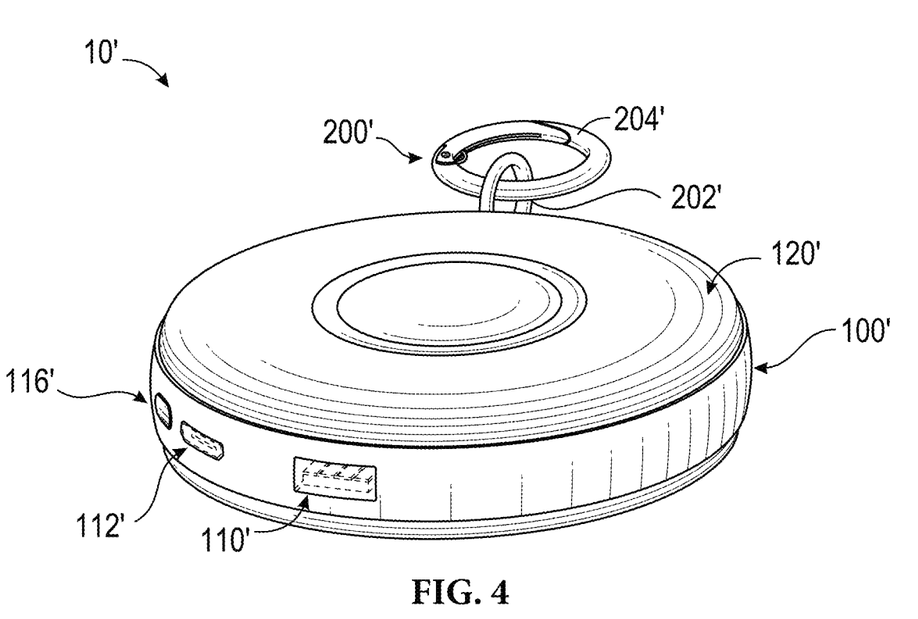
FIG. 4 shows a perspective view of a second embodiment of a decorative and portable power charger in accordance with the present invention.
Figure 5:
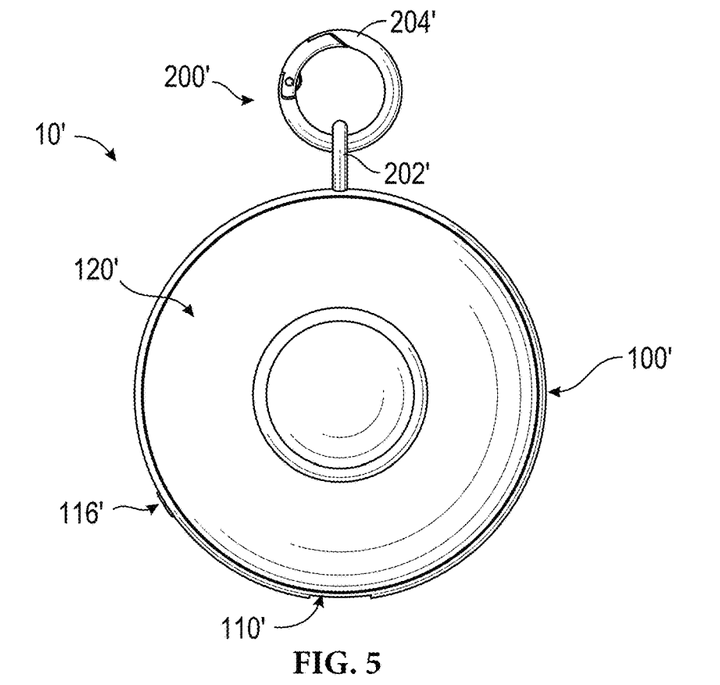
FIG. 5 shows a planar front view of the power charger shown in FIG. 4.
Figure 6:
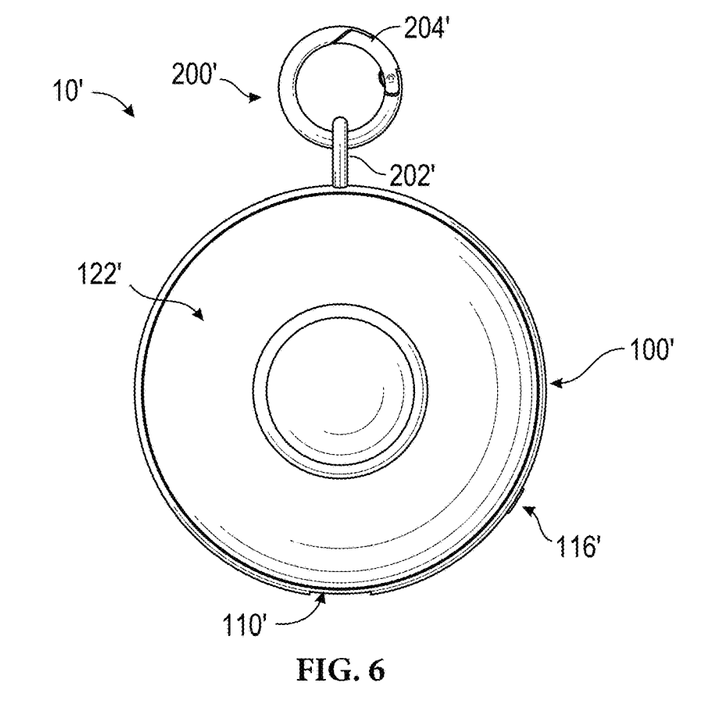
FIG. 6 shows a planar back view of the power charger shown in FIG. 4.
Figure 7:
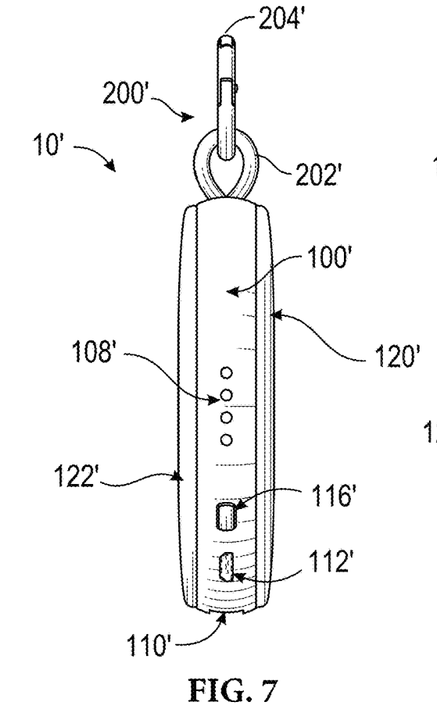
FIG. 7 shows a planar left-hand side view of the power charger shown in FIG. 4.
Figure 8:
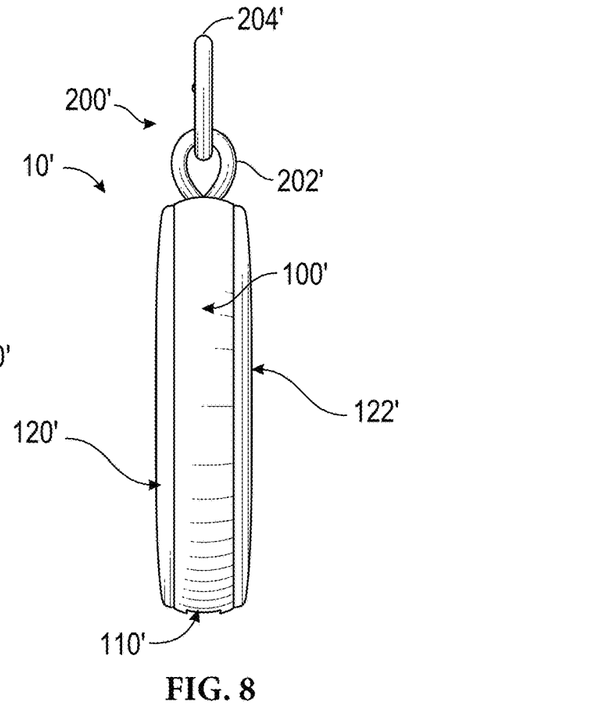
FIG. 8 shows a planar right-hand side view of the power charger shown in FIG. 4.
Figure 9:
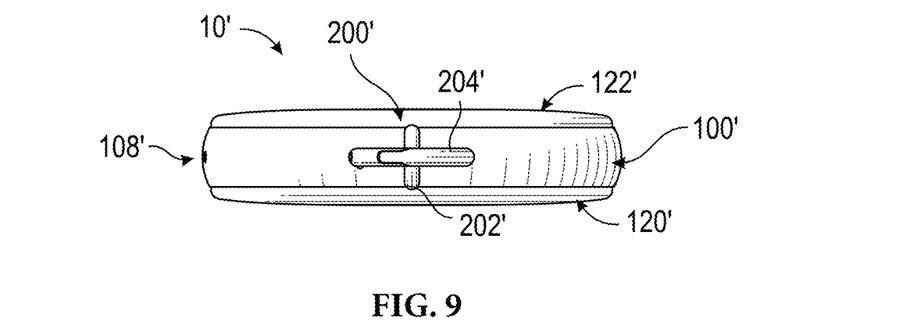
FIG. 9 shows a planar top view of the power charger shown in FIG. 4.

Referring more particularly to FIG. 4, the charger 10' includes a housing 100' connected to an attaching element 200' for attaching the charger to an object, such as a purse, a briefcase, or an article of clothing. As illustrated in FIGS. 5-6, the housing 100' is generally circular and houses an internally disposed battery 106', illustrated in more detail in FIG. 11. Referring to FIG. 7, the housing 100' includes first and second opposing faces 120' and 122', respectively, each preferably bearing made from a translucent material to define a translucent portion or window through which light may be projected. In this regard, the housing also includes at least one internally mounted light element 102' that can project light through the translucent faces 120' and 122' when activated. Though both faces 120' and 122' are preferably translucent, one or the other may be opaque so that light only projects through one face without departing from the spirit and principles of the present invention.

Figure 11:
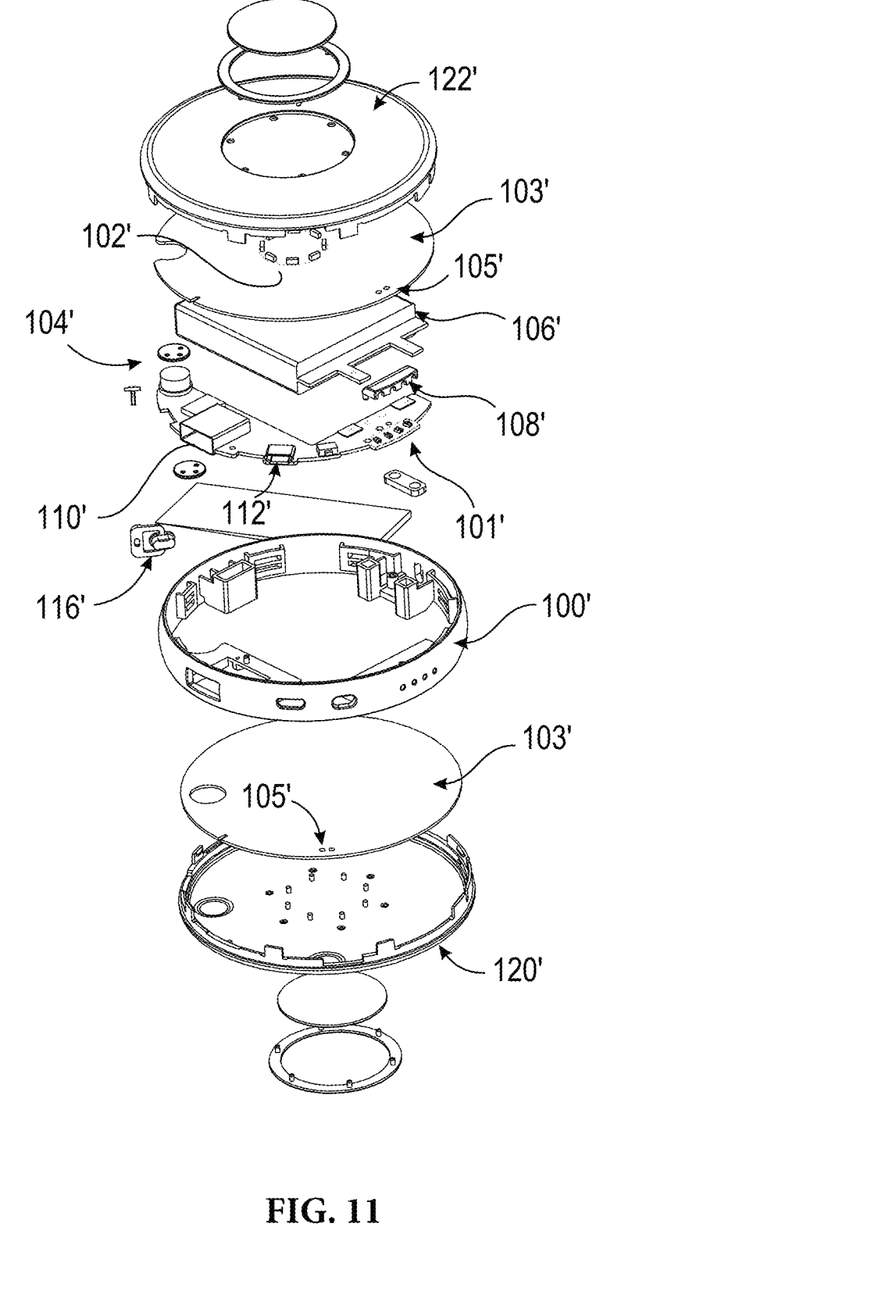
FIG. 11 shows an exploded perspective view of the power charger shown in FIG. 4.

Referring to FIG. 11, the lighting element 102' comprises a plurality of LED lights mounted on an LED board 103', with a separate LED board 103' with LED lights for each face 120' and 122' of the charger 10'. As illustrated, each side of the charger 10' uses eight outwardly facing LED lights 102'. The light from these LED lights can be reflected by the LED board 103' to amplify the intensity of the projected light, which appears as a glow through the translucent windows of the faces 120' and 122'. The LED board 103' further includes electrical contacts 105' for connecting with the battery 106'.

In accordance with preferred embodiments of the present invention, a motion detector 104' is disposed within the housing 100' and operatively connected with the lighting element 102' and the rechargeable battery 106'. In use, when the motion detector 104' detects motion, such as the user waving her hand over the face of the charger 10', the motion detector 104' activates the lighting element 102'. The light from the lighting element 102' projects or glows through the translucent faces 120' and 122' of the charger housing 100'. In preferred embodiments, when the lighting element 102' is activated, the LED lights turn on at a low intensity and brightness (starting level) and gradually increase in intensity and brightness to a preset level ideal for use of the charger 10' to illuminate objects or an immediate area in darkness. Once on, the lighting element 102' will preferably stay on for a predetermined and preset time period, after which, the lights will turn off until the motion detector 104' is triggered again. For example, in use, the user can wave her hand over the face of the charger 10' and the motion detector 104' will trigger and activate the lights 102' which will stay on for about 25 seconds and then turn off.

In an alternate embodiment, a manual power button 116' can be included to manually turn the lighting element 102' on and off. The button 116' can be used in combination with the motion detector 104' such that the lighting element 102' can be immediately turned on by pressing the button 116', or alternatively, when the lights are already on, they can be immediately turned off by pressing the button 116'.

Figure 10:
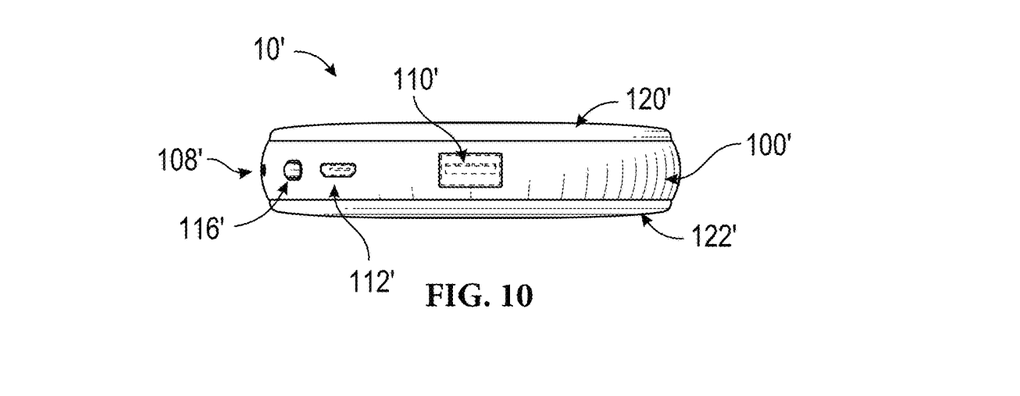
FIG. 10 shows a planar bottom view of the power charger shown in FIG. 4.

Referring to FIGS. 7 and 10, the charger 10' includes a first power port 110' and a second power port 112', both operatively connected to the rechargeable battery 106'. As with the embodiment of FIGS. 1-3, either of the ports 110' and 112' may act as either a power input (for recharging the internal battery 106') or a power output (for recharging electronic devices connected to the charger 10' via said port), or both by using two-way charging connectivity. Still further, the charger 10' may include wireless transmission components, including a wireless transmitter and a wireless receiver, or alternatively, NFC antenna(es), to wirelessly recharge electronic devices or be wirelessly recharged itself, in the manners discussed above. As illustrated, the first power port 110' comprises a USB port, while the second power port 112' comprises a micro-USB port. In use, the power charger 10' will automatically turn on to supply a charge to an electronic device once the device is plugged into the power output port. After the electronic device is disconnected from the charger 10', the charger 10' will turn off after a predetermined and preset time period, e.g., 25 seconds.

Referring again to FIG. 7, a power indicator means 108' is also provided to indicate the capacity level of the internal battery 106'. As shown in FIG. 11, the power indicator means 108' is mounted on a circuit board 101' which includes a processor unit in operatively communication with the power indicator means 108' and the battery 106', as well as interconnecting the battery 106' with the ports 110' and 112', the motion detector 104' and the lighting element 102'.

Referring to FIG. 4, the attaching element 200' comprises a carabiner clip 204' attached to the housing 100' by a flexible cord 202'. Alternate attaching and fastening means may be used without departing from the spirit and principles of the present invention.

Figure 12:
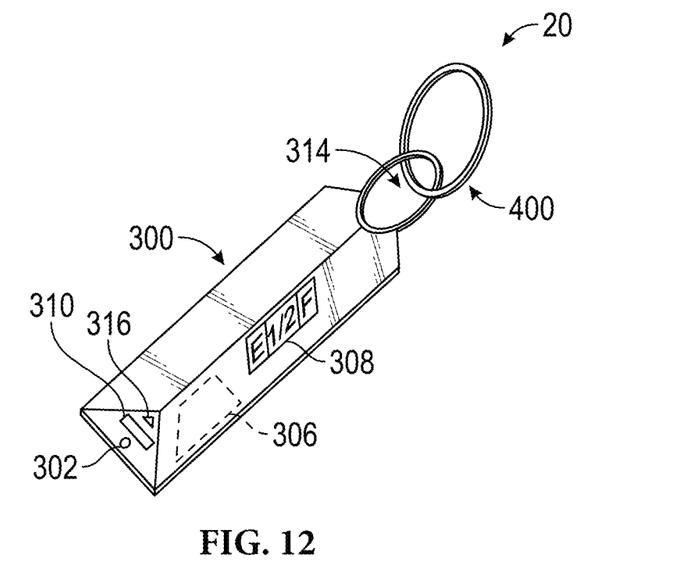
FIG. 12 shows a top, perspective view of a third embodiment of a decorative and portable power charger in accordance with the present invention.

With reference to FIG. 12, a third embodiment of a decorative portable power charger 20 is shown. The charger 20 includes a housing 300 connected to an attaching element 400. The housing 300 includes at least one light element 302, an internal rechargeable battery 306 disposed within the housing 300 and a power indicator 308. The housing 300 defines a first power port 310, a loop opening 314 and a power button 316. The rechargeable battery 306 is operatively connected to the first power port 310.

The at least one light element 302 is configured to generate light when powered by the rechargeable battery 306. The at least one light element 302 may be configured to generate light when the power button 316 is manually activated by a user of the charger 20. The charger 20 could also include a motion sensor whereby the light element 302 illuminates when motion is detected.

The rechargeable battery 306 is configured to be charged when the first power port 310 is connected to an external power source (not shown). The rechargeable battery 306 may charge the internal battery of another electronic device (not shown) when the first power port 310 is connected to the electronic device. Alternatively, additional power connector ports may be provided such that at least one port acts as an input or at least one port acts as an output port. Still further, a retractable cable can be provided and operatively connected with the internal rechargeable battery 306 to act as an input, output, or both.

The power indicator 308 is configured to indicate a battery charge status of the rechargeable battery 306. For example, the power indicator 308 may be a series of LED lights that represent the level of charge of the rechargeable battery 306 or, alternatively, the power indicator 308 may be a single LED light that generates a colored light that represents the level of charge of the rechargeable battery 306, e.g. green light for full or near full charge and a red light for low or near no charge. As illustrated, the power indicator 308 includes designators "E," "½," and "F" to assist in providing the power capacity of the internal rechargeable battery 306 as empty, half full or full.

The attaching element 400 is configured as a split ring. The attaching element 400 is configured to attach to the housing 300 by having a portion of the attaching element be positioned through the loop opening 314 of the housing 300. While the attaching element 400 is shown as a split ring, it should be readily understood that other attaching element configurations are within the principles of the present disclosure. For example, the attaching element 400 may be a carabiner, clip or the like.

Figure 13:
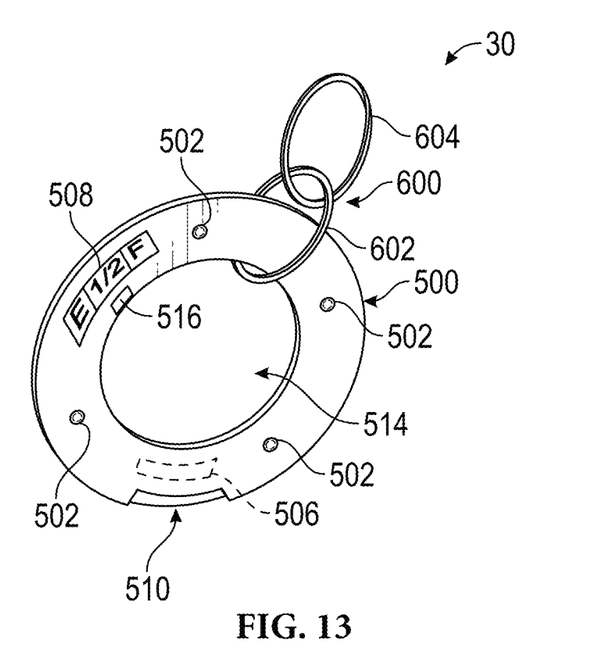
FIG. 13 shows a top, perspective view of a fourth embodiment of a decorative and portable power charger in accordance with the present invention.

With reference to FIG. 13, a fourth embodiment of a decorative portable power charger 30 is shown. The charger 30 includes a housing 500 connected to an attaching element 600. The housing 500 includes at least one light element 502, an internal rechargeable battery 506 disposed within the housing 500 and a power indicator 508. The housing 500 defines a first power port 510, a loop opening 514 and a power button 516. The rechargeable battery 506 is operatively connected to the first power port 510.

The at least one light element 502 is configured to generate light when powered by the rechargeable battery 506. The at least one light element 502 may be configured to generate light when the power button 516 is manually activated by a user of the charger 30. As illustrated, the charger 30 includes multiple LED lights spread around the toroidal shape of the charger housing 500 to disperse light evenly therefrom. Such lights can be used for safety purposes, to help the user find objects (for example, in a purse), to help the user connect an electronic device to the charger 30 in the dark, or merely for aesthetics. The charger 30 may also include a motion sensor that is configured to activate the LED lights when motion is detected.

The rechargeable battery 506 is configured to be charged when the first power port 510 is connected to an external power source (not shown). The rechargeable battery 506 may charge the internal battery of another electronic device (not shown) when the first power port 510 is connected to the electronic device. Additional connection ports can be included to act as a power input, a power output, or both. Still further, a retractable cable can be provided and operatively connected with the internal rechargeable battery 506 and act as an input, output, or both.

The power indicator 508 is configured to indicate a battery charge status of the rechargeable battery 506. For example, the power indicator 508 may be a series of LED lights that represent the level of charge of the rechargeable battery 506 or, alternatively, the power indicator 508 may be a single LED light that generates a colored light that represents the level of charge of the rechargeable battery 506, e.g. green light for full or near full charge and a red light for low or near no charge, or a fuel gauge such as illustrated in FIG. 11.

The attaching element 600 includes a ring 602 and a split ring 604. The ring 602 is configured to attach to the housing 500 by having a portion of the ring 602 be positioned through the loop opening 514 of the housing 500. The split ring 604 is attached or linked to the ring 602. While the attaching element 600 is shown as a ring and split ring combination, it should be readily understood that other attaching element configurations are within the principles of the present disclosure. For example, the attaching element 600 may be a carabiner, clip or other combination.

While the first power port 110, 110', 310, 510 and second power port 112, 112', 312, 512 have been shown as female power ports, it should be readily understood that the power ports may be instead formed as male power interfaces configured to connect with a female port of an external power source or other electronic device. It should also be readily understood that the first power port 110, 110', 310, 510 and second power port 112, 112', 312, 512 may be any type of port known in the art for establishing an electrical connection. For example, the first power port 110, 110', 310, 510 and second power port 112, 112', 312, 512 may be a USB port, a micro USB port or a combination of different kinds of port types.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A portable power charger comprising:
   a charger housing having first and second opposing faces;
   a rechargeable battery internally disposed within the charger housing;
   an attaching element attached to the charger housing and being configured to attach to an object;
   a lighting element disposed within the charger housing and operatively connected to the internal rechargeable battery;
   a motion detector disposed within the charger housing and operatively connected with the lighting element; and
   a first power connector operatively connected to the internal rechargeable battery capable of operating as at least one of a power input and a power output, wherein when said first power connector acts as a power input, an electrical charge current is provided from an external power source to the portable power charger for recharging the rechargeable battery when the portable power charger is connected to said external power source via said first power connector, and wherein when said first power connector acts as a power output, a charge is provided from the rechargeable battery of the portable power charger to an electronic device to recharge a battery of said electronic device when said electronic device is connected to the portable power charger via said first power connector;
   wherein at least one of the first and second faces of the charger housing comprises a translucent portion through which light from the lighting element can be projected; and wherein the motion detector is configured to activate the lighting element when motion proximate to one of the first and second opposing faces of the charger housing is detected.

2. The portable power charger according to claim 1, wherein the lighting element turns on at a first intensity when the motion detector is triggered and increases to a second, higher intensity within a predetermined time period.

3. The portable power charger according to claim 1, wherein the lighting element turns off after a predetermined time period following its activation.

4. The portable power charger according to claim 1, wherein the first and second faces each comprise a respective translucent portion through which light from the lighting element can be projected.

5. The portable power charger according to claim 4, wherein the lighting element comprises at least one LED light for each of the first and second faces.

6. The portable power charger according to claim 1, wherein the first power connector is selected from the group consisting of a female power port and a male power cable.

7. The portable power charger according to claim 1, further comprising a second power connector operatively connected to the internal rechargeable battery, wherein the internal rechargeable battery is configured to be charged when an external power source is connected to the first power connector or the second power connector and simultaneously charge an electronic device when the electronic device is connected to the other of the first power connector or the second power connector.

8. The portable power charger according to claim 1, further comprising a wireless transmitter disposed within the charger housing and operatively connected to the internal rechargeable battery, wherein the wireless transmitter is configured to charge an internal battery of an electronic device when the wireless transmitter is in proximity to a wireless receiver of the electronic device.

9. The portable power charger according to claim 1, further comprising a wireless receiver disposed within the charger housing and operatively connected to the internal rechargeable battery, wherein the wireless receiver is configured to charge the internal rechargeable battery when the wireless receiver is in proximity to a wireless transmission station.

10. The portable power charger according to claim 9, further comprising a wireless transmitter disposed within the charger housing and operatively connected to the internal rechargeable battery, wherein the wireless transmitter is configured to charge an internal battery of an electronic device when the wireless transmitter is in proximity to a wireless receiver of the electronic device.

11. A portable power charger comprising:
a charger housing having first and second opposing faces, each of said faces comprising a respective translucent portion;
a rechargeable battery internally disposed within the charger housing;
an attaching element attached to the charger housing and being configured to attach to an object;
first and second lighting elements disposed within the charger housing and respectively associated with the first and second faces of the charger housing so that light from said first and second lighting elements, when activated, projects through the translucent portions of the first and second faces, respectively, each of the first and second lighting elements being operatively connected to the internal rechargeable battery; and
a first power connector operatively connected to the internal rechargeable battery capable of operating as at least one of a power input and a power output, wherein when said first power connector acts as a power input, an electrical charge current is provided from an external power source to the portable power charger for recharging the rechargeable battery when the portable power charger is connected to said external power source via said first power connector, and wherein when said first power connector acts as a power output, a charge is provided from the rechargeable battery of the portable power charger to an electronic device to recharge a battery of said electronic device when said electronic device is connected to the portable power charger via said first power connector.

12. The portable power charger according to claim 11, further comprising:
a motion detector disposed within the charger housing and operatively connected with the first and second lighting elements;
wherein the motion detector is configured to activate the first and second lighting elements when motion proximate to one of the first and second opposing faces of the charger housing is detected.

13. The portable power charger according to claim 12, wherein the first and second lighting elements turn on at the same time, each at a first intensity, when the motion detector is triggered and wherein the first and second lighting elements both increase to a second, higher intensity within a predetermined time period.

14. The portable power charger according to claim 12, wherein the first and second lighting elements turn off after a predetermined time period following their activation.

15. The portable power charger according to claim 11, wherein the first and second lighting elements each comprises at least one LED light projected outwardly toward the respective first and second faces of the charger housing.

16. The portable power charger according to claim 11, wherein the first power connector is selected from the group consisting of a female power port and a male power cable.

17. The portable power charger according to claim 11, further comprising a second power connector operatively connected to the internal rechargeable battery, wherein the internal rechargeable battery is configured to be charged when an external power source is connected to the first power connector or the second power connector and simultaneously charge an electronic device when the electronic device is connected to the other of the first power connector or the second power connector.

18. The portable power charger according to claim 11, further comprising a wireless transmitter disposed within the charger housing and operatively connected to the internal rechargeable battery, wherein the wireless transmitter is configured to charge an internal battery of an electronic device when the wireless transmitter is in proximity to a wireless receiver of the electronic device.

19. The portable power charger according to claim 18, further comprising a wireless receiver disposed within the charger housing and operatively connected to the internal rechargeable battery, wherein the wireless receiver is configured to charge the internal rechargeable battery when the wireless receiver is in proximity to a wireless transmission station.

* * * * *